United States Patent
Liang et al.

(10) Patent No.: US 11,170,810 B1
(45) Date of Patent: Nov. 9, 2021

(54) DETERMINING IN-PLANE BOW OF A TAPE DRIVE HEAD MODULE

(71) Applicant: International Business Machines Corporation, Armonk, NY (US)

(72) Inventors: Jason Liang, Campbell, CA (US); Robert Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/169,957

(22) Filed: Feb. 8, 2021

(51) Int. Cl.
*G11B 5/455* (2006.01)
*G11B 5/29* (2006.01)
*G11B 5/31* (2006.01)
*G11B 5/008* (2006.01)
*G11B 5/48* (2006.01)
*G11B 5/39* (2006.01)

(52) U.S. Cl.
CPC .......... *G11B 5/455* (2013.01); *G11B 5/00826* (2013.01); *G11B 5/29* (2013.01); *G11B 5/3103* (2013.01); *G11B 5/3166* (2013.01); *G11B 5/4893* (2013.01); *G11B 5/3977* (2013.01)

(58) Field of Classification Search
None
See application file for complete search history.

(56) References Cited

U.S. PATENT DOCUMENTS

| | | | |
|---|---|---|---|
| 6,496,329 B2 | 12/2002 | Hungerford et al. | |
| 6,700,729 B1 | 3/2004 | Beck et al. | |
| 6,831,277 B1 | 12/2004 | Nakata et al. | |
| 6,898,045 B2 | 5/2005 | Beck et al. | |
| 7,963,023 B2 | 6/2011 | Lau | |
| 9,865,286 B2 | 1/2018 | Hwang et al. | |
| 2019/0362750 A1* | 11/2019 | Biskeborn et al. | G11B 5/5504 |

FOREIGN PATENT DOCUMENTS

GB    2287353 A    9/1995

OTHER PUBLICATIONS

Patton et al., "Micromechanical and tribological characterization of alternate pole tip materials for magnetic recording heads," Wear 202, 1996, pp. 99-109, Elsevier.

* cited by examiner

*Primary Examiner* — Craig A. Renner
(74) *Attorney, Agent, or Firm* — Donald J. O'Brien

(57) ABSTRACT

Embodiments are disclosed for a method. The method includes determining a reference plane for a tape drive read-write array. The tape drive read-write array includes a first array element, a predetermined array element, and a last array element. Further, determining the reference plane is based on a first array position of the first array element and a last array position of the last array element. The method also includes capturing a position of a predetermined array element using an imaging device. The method further includes determining a deviation of the captured position from the reference plane. Additionally, the method includes generating a plot of an in-plane bow based on the deviation.

20 Claims, 8 Drawing Sheets

DETERMINING IN-PLANE BOW OF A TAPE DRIVE HEAD MODULE

BACKGROUND

The present disclosure relates to in-plane bow, and more specifically, to determining in-plane bow of a tape drive head module.

The tape drive head module (head module) can be an electrical component of a tape drive that reads from, and writes to, magnetic tape. The head module can include multiple reader and writer heads. These heads include arrays of electrical elements that physically read and write the magnetic codes on the tape. In these arrays, the reader heads have reading sensors, and the writer heads have writing devices. When manufactured, the elements on each head can be aligned in a column. This alignment makes it possible to ensure that respective read and write sensors are positioned in proximity with the same track on the magnetic tape.

SUMMARY

Embodiments are disclosed for a method. The method includes determining a reference plane for a tape drive read-write array. The tape drive read-write array includes a first array element, a predetermined array element, and a last array element. Further, determining the reference plane is based on a first array position of the first array element and a last array position of the last array element. The method also includes capturing a position of a predetermined array element using an imaging device. The method further includes determining a deviation of the captured position from the reference plane. Additionally, the method includes generating a plot of an in-plane bow based on the deviation.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
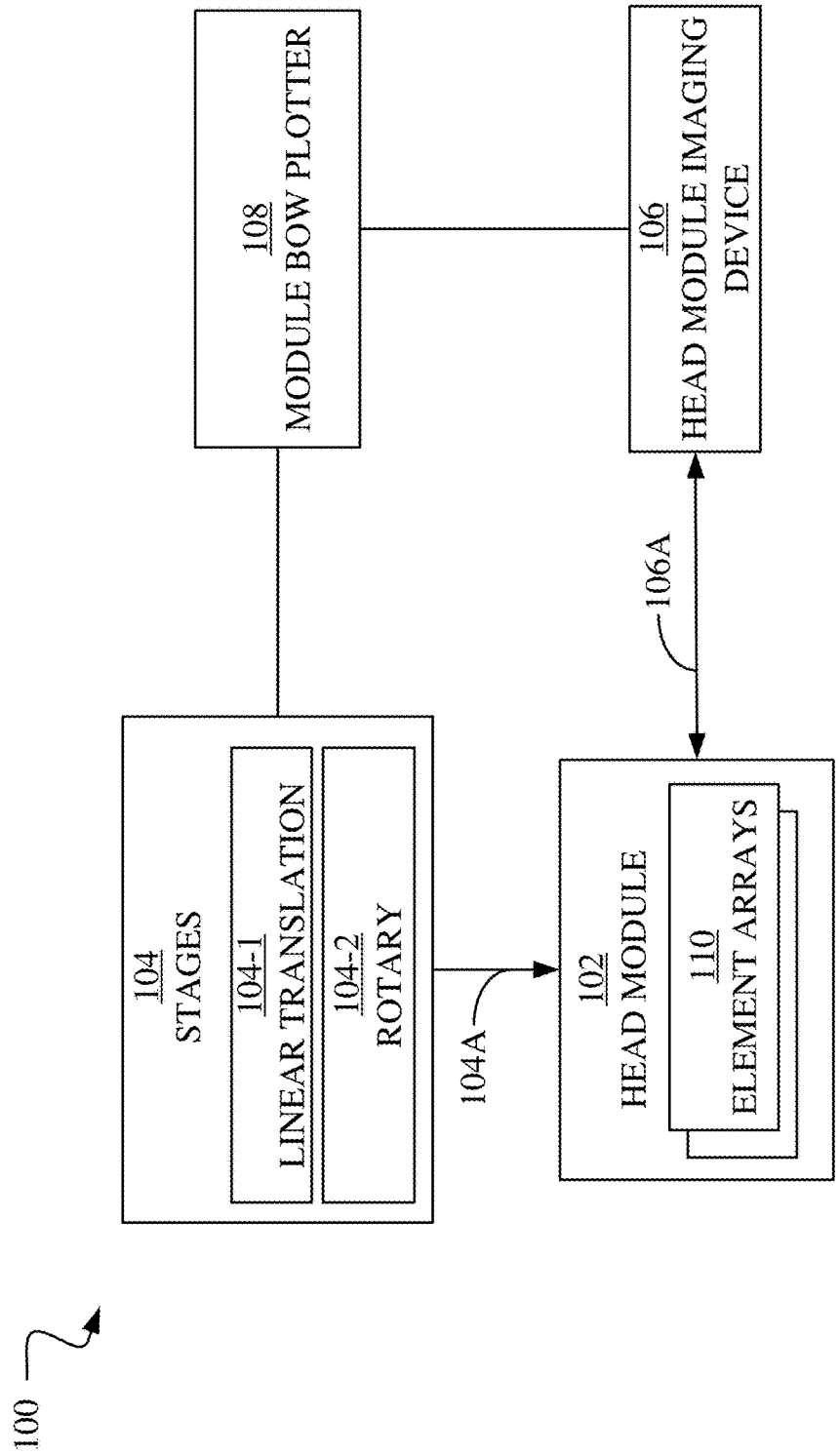
FIG. 1 is a block diagram of an example system for determining in-plane bow of a tape drive head module, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

As stated previously, head module elements can be aligned in a column during manufacturing to ensure that respective read and write elements are positioned in proximity with the same track on the magnetic tape. While the tape drive can tolerate relatively small misalignment, the increasing densities used to store data on tape are making these tolerances increasingly smaller. As such, the misalignment of the head module elements can lead to timing errors and positioning errors when reading and writing the magnetic tape. Thus, the alignment of the tape drive head module elements is useful to avoid timing and positioning errors.

As stated previously, the alignment of head module elements can derive from manufacture, specifically, the wafer deposition process. The wafer deposition process can involve physically placing the individual read and write elements on reader heads and writer heads. During wafer deposition, the head module elements can be deposited on the uniform, flat plane of a wafer substrate. However, subsequent fabrication and assembly processes can cause in-plane bow to the initially uniform, flat plane. In-plane bow, which includes negative and positive bows, refers to a curved shape of the wafer in the direction of where the read-write elements are deposited. From a top-down view of the head module (with the tape bearing surface facing up), the in-plane bow can cause the head module to look like a left parenthesis, "(," or, a right parenthesis, ")," respectively, negative or positive bow. Negative and positive bow are also referred to herein as concave and convex. In addition to causing in-plane bow to the head module, manufacturing and use of the head module can cause twists in the individual heads and/or the head module. Such twists can also misalign the head module elements. In order to compensate for any misalignment, it can be useful to measure the in-plane bow of the head module and/or the misalignment of any individual head module elements.

Conventional methods to measure the in-plane bow can involve turning the head module on its side and using interferometry or stylus profilometry to measure the curvature of the in-plane bow. However, both of these techniques can involve challenges. For example, interferometry may not be useful if the surface of the module side (closure) is not polished and reflective. Further, stylus profilometry may not be useful without a relatively precise alignment of the module with the travel of the stylus. Additionally, both of these techniques may only provide an estimate of in-plane bow because the bow of the closure may not be equal to the bow of the wafer substrate. Further, neither method can determine the misalignment of each specific read-write element. The closure piece is an add-on wafer substrate piece that is glued to the head. If this piece is glued on with a bow, the measured bow by interferometry or stylus would not be representative of the actual head bow.

Accordingly, some embodiments of the present disclosure can measure and plot the in-plane bow of a tape drive head module. The in-plane bow can represent the offset location of a read-write element of the head module. Additionally, some embodiments of the present disclosure can determine the precise amount that each element of the head module is offset from an aligned position. By knowing the offset locations, it is possible to improve the accuracy with which the head module reads data from, and writes data to, magnetic tape. Further, this information can make it possible to determine whether replacing a head module would improve read-write performance. In this way, some embodiments of the present disclosure can improve the operation of tape drives, and the various computer processing and/or other systems that rely on tape drives.

FIG. 1 is a block diagram of an example system 100 for determining in-plane bow of a tape drive head module, in accordance with some embodiments of the present disclosure. The system 100 includes a head module 102, stages 104, head module imaging device 106, and module bow plotter 108.

The head module 102 can be a tape drive head module for reading data from, and writing data to, magnetic tape mounted on a tape drive. The head module 102 can include multiple element arrays 110. Each element array 110 can represent a reader or writer head, with its array of head module elements. These head module elements can include, but are not limited to, readers, writers, servos, electronic lapping guides (ELGS), and fiducial markers. As stated previously, the head module 102 can become bowed through manufacturing and use. Accordingly, the system 100, specifically with respect to the stages 104, head module imaging device 106, and module bow plotter 108, can determine in-plane bow of the head module 102.

The stages 104 can include a linear translation stage 104-1 and a rotary stage 104-2 that may be physically engaged with the head module 102, as indicated by the directional arrow 104A. The arrow 104A represents that the stages 104 act upon the head module 102. More specifically, the linear translation stage 104-1 can be an electric-mechanical device having micrometer positioning accuracy that can manipulate the head module 102 laterally. Additionally, the rotary stage 104-2 can be an electric-mechanical device having micrometer positioning accuracy that can manipulate the head module 102 rotationally.

The head module imaging device 106 can be an electric-mechanical device capable of capturing images based on reflected electromagnetic radiation generated by the head module imaging device 106. In some embodiments of the present disclosure, the head module imaging device 106 can be an atomic force microscope, an electron microscope, and/or a high-powered microscope, such as, an ultra-violet (UV) microscope.

The bi-directional arrow 106A represents interactions between the head module 102 and the head module imaging device 106. More specifically, in the direction from the head module imaging device 106 to the head module 102, the arrow 106A indicates that the head module imaging device 106 can illuminate the head module 102 with electromagnetic radiation. Additionally, in the direction from the head module 102 to the head module imaging device 106, the arrow 106A represents the head module 102 reflecting the electromagnetic radiation such that the head module imaging device 106 can capture an image of the element array 110.

Additionally, the module bow plotter 108 can be a computer-based controller that directs the operation of the stages 104 and head module imaging device 106 to capture multiple images of the element arrays 110. Additionally, the module bow plotter 108 can determine in-plane bow of the head module 102 based on the captured images. In some embodiments, the module bow plotter 108 can determine a lateral offset of each element of the element array 110 based on the captured images. Further, the module bow plotter 108 can generate a plot of the lateral offsets of the elements of the element array 110. The generated plot can visually represent the in-plane module bow of the head module 102. In this way, the module bow plotter 108 can accurately measure the in-plane bow of the head module 102 and the amount each element is deviated from an aligned position.

The module bow plotter 108 can execute on a computer host device, having a computer processor and memory for executing instructions to perform the techniques described herein. In some embodiments of the present disclosure, the module bow plotter 108 can be a system on a chip.

Figure 2A:
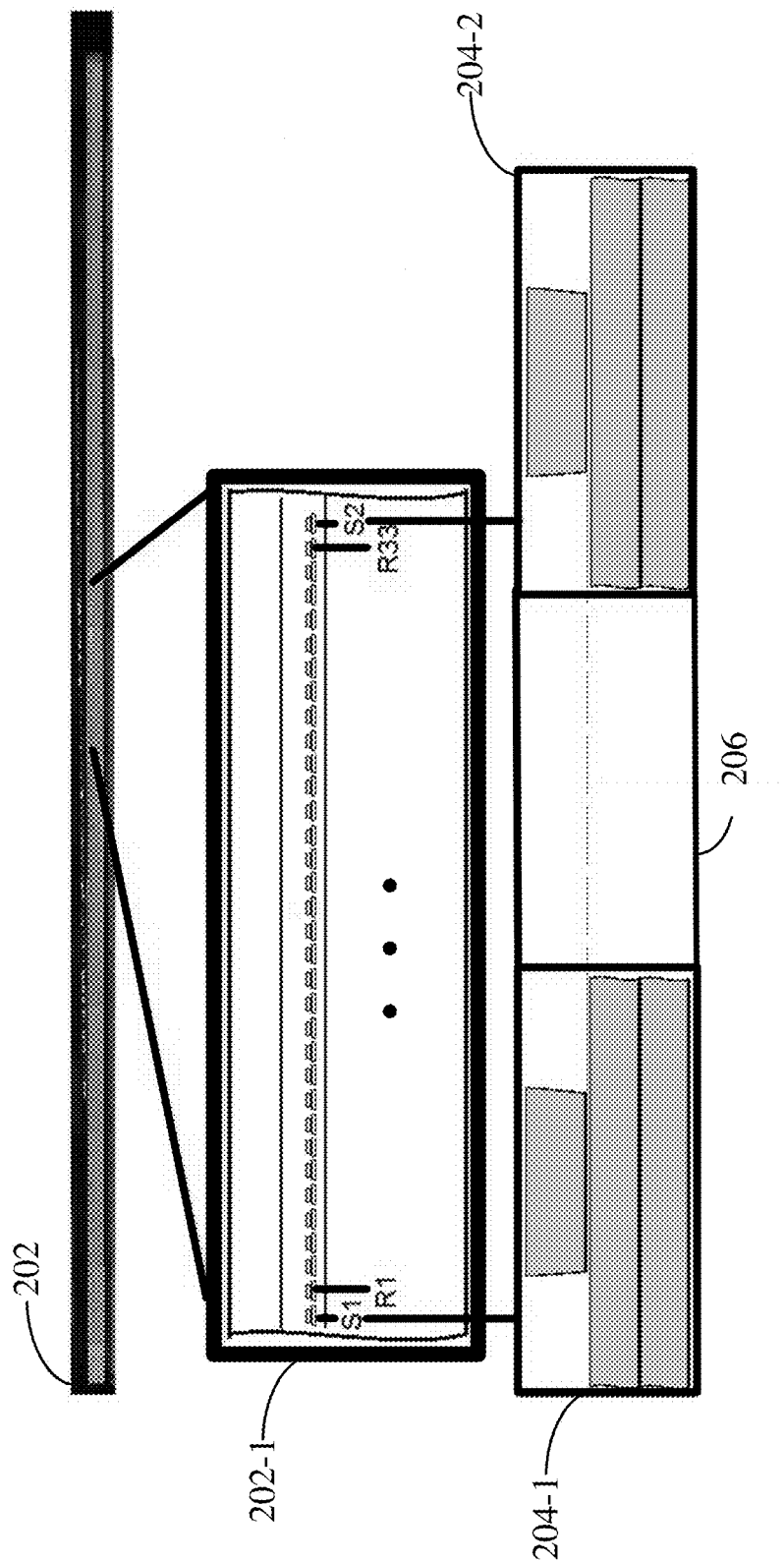
FIG. 2A is a block diagram of an example head module, in accordance with some embodiments of the present disclosure.

FIG. 2A is a block diagram of an example head module 202, in accordance with some embodiments of the present disclosure. The head module 202 can be similar to the head module 102 described with respect to FIG. 1. The head module 202 can include an element array 202-1. The element array 202-1 can be similar to the element array 110. As stated previously, the head module 202 can include multiple reader and writer heads. The element array 202-1 can represent a reader head having multiple head module elements, including servo elements (servos) S1, S2, and read elements R1 through R33. While the element array 202-1 may merely read 32 tracks at a time, a total of 33 read elements can be included to read magnetic tape in forward and reverse directions. In a forward direction, the element array 202-1 reads 32 tracks using read elements R1 through R32. In a reverse direction, the element array 202-1 reads 32 tracks using read elements R2 through R33. Although not shown, the head module 202 can include additional reader heads similarly configured, and multiple writer heads. Similar to the reader head having read elements R1 through R33, a writer head can have write elements W1 through W33.

As stated previously, the module bow plotter 108 can direct the stages 104 to manipulate the head module 202, and the head module imaging device 106 to capture an image of the head module elements of the element array 202-1. More specifically, the head module imaging device 106 can capture image 204-1 of two head module elements that can serve as a reference for alignment of the element array 202-1. The images 204-1, 204-2 can include details of the servos S1, S2, respectively. These details can include shields of the servo sensor. These shields may be bits of shiny metal that prevent electromagnetic interference from corrupting the servo sensor operation. The top shield can represent the width of a track on tape. The servo sensor, which is smaller than the shields, can be disposed approximate to the center of the three shields. Other head module elements can include different configurations than described for the shields of servos S1, S2.

As stated previously, the servos S1, S2 can serve as a reference for alignment of the element array 202-1. For example, the head module imaging device 106 can generate image 204-1 of servo S1, and image 204-2 of servo S2. As the servos S1, S2 are the end elements of the element array 202-1, the module bow plotter 108 can generate a reference plane 206 from the servo S1 to the servo S2 that can include a center alignment position of the read elements R1 through R33. The module bow plotter 108 can determine that the reference plane 206 encompasses the horizontal and vertical outlines of the servos S1, S2 in the images 204-1, 204-2.

As stated previously, the closer to the alignment position defined by the reference plane that the read sensor R(n) is, the closer the read sensor R(n) is to the center of the track being read, and thus, the more accurate the read is from read sensor R(n). Features on the readers and servos, such as, the plane of the sensor, the junctions of the sensor, or even custom-built measurement fiducials, can be used as identifying markers. The bow plotter identifies these markers at each measured device. Thus, the markers at the outer edge (204-1 and 204-2) can define the reference plane 206. According to some embodiments, the module bow plotter 108 can determine a reference line instead of the reference plane. In such embodiments, the reference line can include a point from the center of each marker.

However, as stated previously, the element array 202-1 can become concave or convex with in-plane module bow. Accordingly, as described below, the module bow plotter 108 can direct the stages 104 and head module imaging device 106 to generate an image of a middle head module element, e.g., read sensor R17, and determine the lateral offset, if any, from the lateral position indicated by the reference plane 206. Further, the module bow plotter 108 can generate a visual plot of the concave or convex bow of the element array 202-1.

Figure 2B:
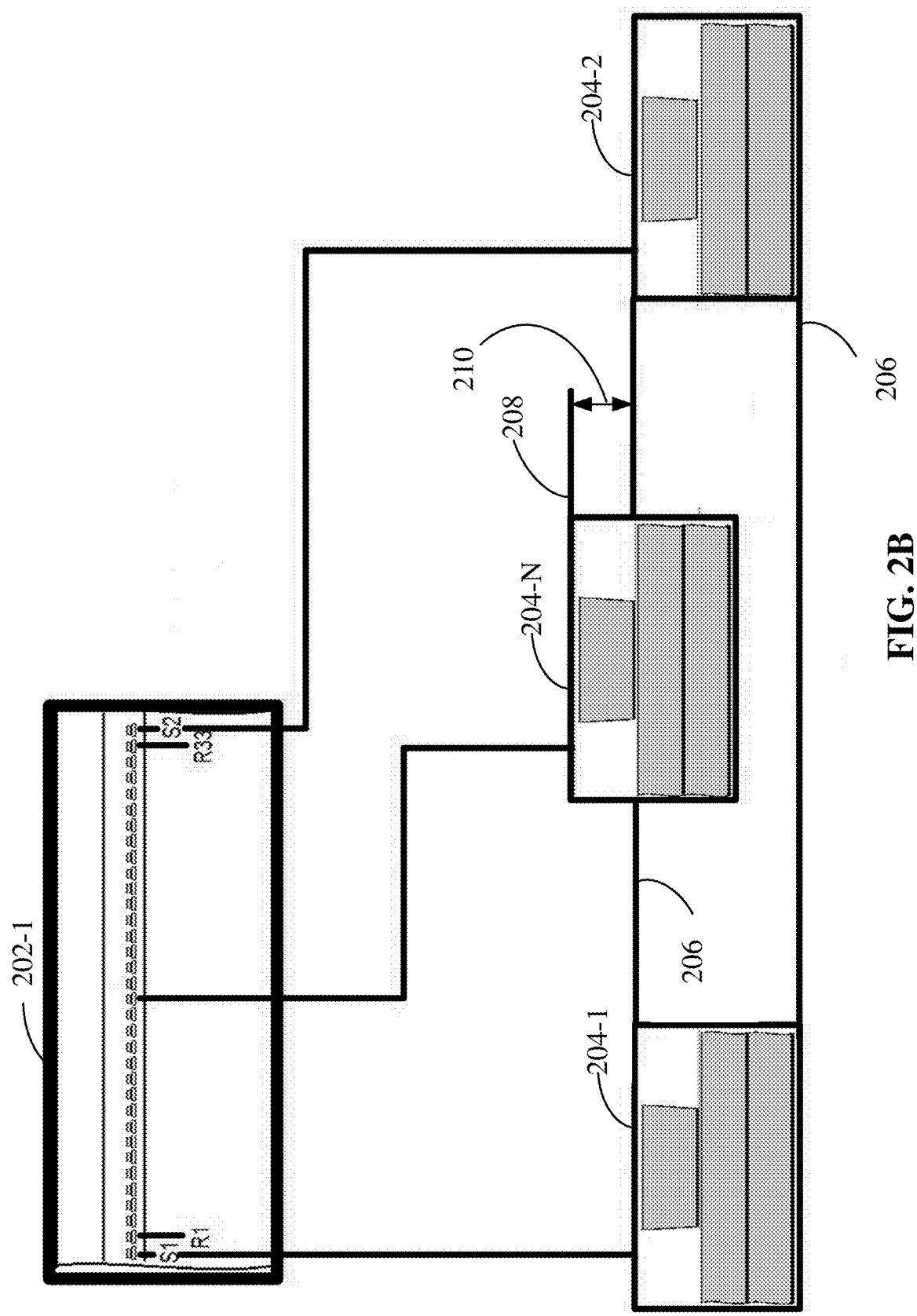
FIG. 2B is a block diagram of an example element array, in accordance with some embodiments of the present disclosure.

FIG. 2B is a block diagram of the example element array 202-1, in accordance with some embodiments of the present disclosure. FIG. 2B includes element array 202-1, images 204-1, 204-2, and reference plane 206 described with respect to FIG. 2A. Additionally, reference plane 206 is shown segmented by image 204-N, which is an image of a read sensor that can represent a middle head module element of element array 202-1, e.g., read sensor R17. Accordingly, if the element array 202-1 has in-plane module bow, the lateral offset of the read sensor R17 can indicate how large of a bow there is. For clarity, the image 204-N is positioned respectively to images 204-1, 204-2 based on the lateral position indicated by image 204-N.

As shown, the position of the read sensor R17 is indicated by line 208. Additionally, the lateral offset of the read sensor R17 is indicated by line 210 connecting line 208 to reference plane 206. Accordingly, based on the images 204-1, 204-2, 204-N, the module bow plotter 108 can determine the lateral offset of the read sensor R17 from the reference plane 206.

In addition to the curvature causing in-plane bow from manufacturing processes, a head module may also undergo twisting and other shaping influences from manufacture and use that can misalign head module elements. Accordingly, in addition to determining the in-plane bow using three head module element images, the module bow plotter 108 can determine more complex changes to the alignment of a head module, such as head module 102.

Figure 2C:
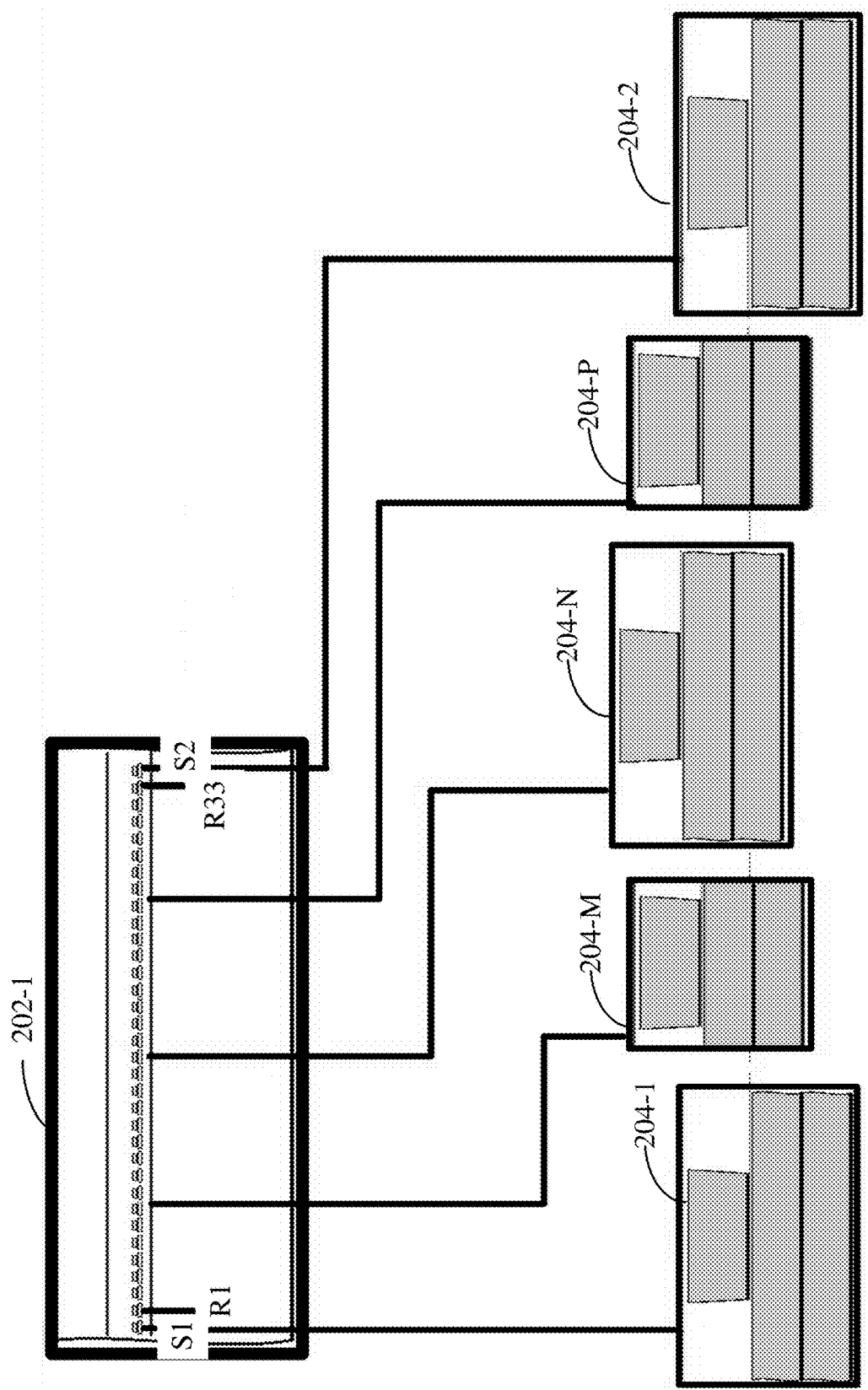
FIG. 2C is a block diagram of the example element array, in accordance with some embodiments of the present disclosure.

FIG. 2C is a block diagram of the example element array 202-1, in accordance with some embodiments of the present disclosure. FIG. 2C includes element array 202-1 and images 204-1, 204-2, 204-N described with respect to FIG. 2A. Additionally, FIG. 2C includes images 204-M, 204-P, which are images of read sensors between servos S1, S2, and read sensor R(n). For clarity, the images 204-M, 204-N, 204-P are positioned respectively to images 204-1, 204-2 based on the lateral position indicated by images 204-M, 204-N, 204-P. Accordingly, module bow plotter 108 can determine the lateral offset of the corresponding read sensors and generate a plot of the in-plane module bow of element array 202-1.

Figure 3A:
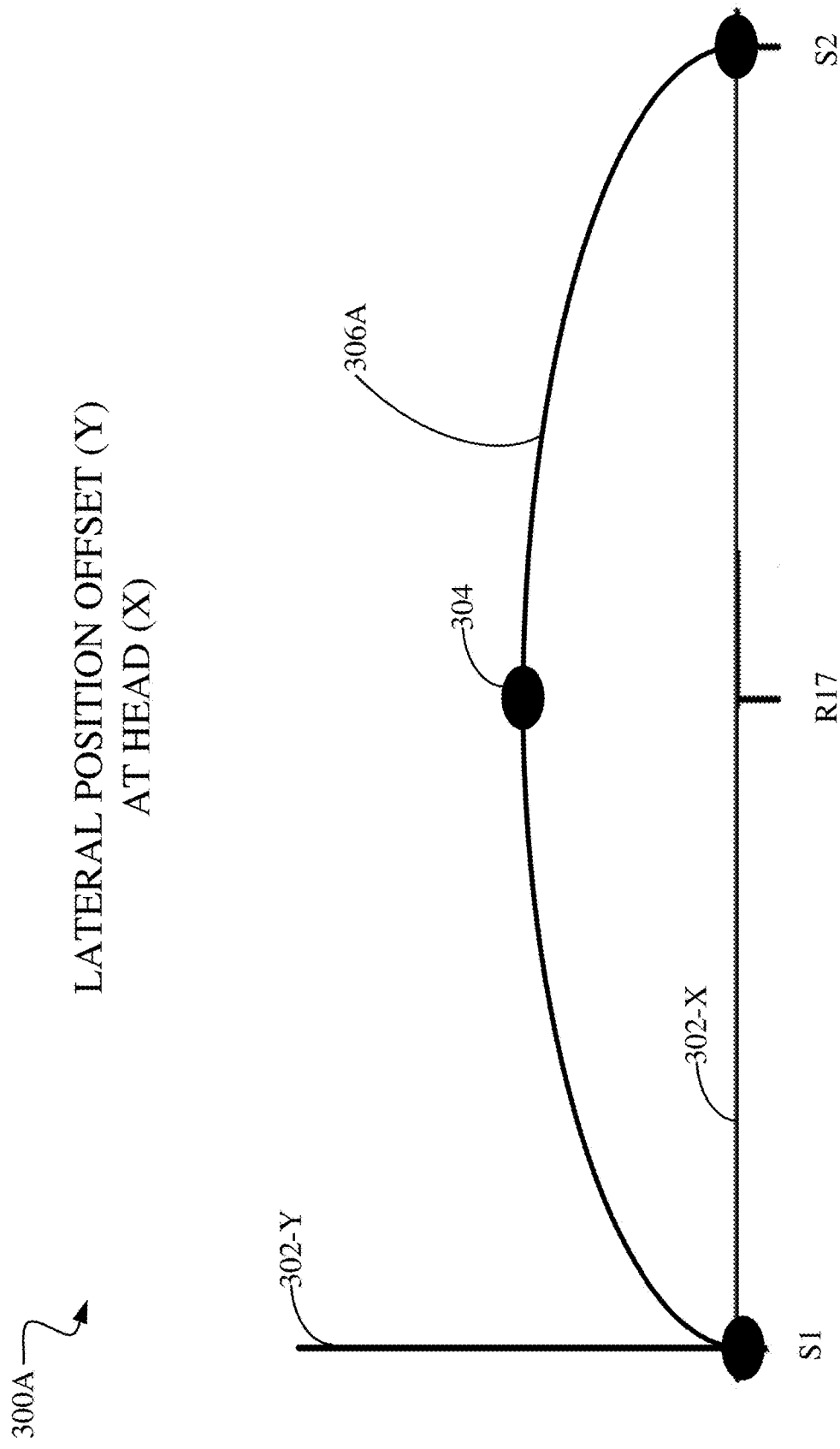
FIG. 3A is a block diagram of the example plot of the example element array, in accordance with some embodiments of the present disclosure.

FIG. 3A is a block diagram of an example plot 300A of the example element array 202-1, in accordance with some embodiments of the present disclosure. The plot 300A represents the lateral position offset of one head module element of the element array 202-1, as described with respect to FIG. 2B. More specifically, the plot 300A includes axes 302-X, 302-Y representing the head module elements and corresponding lateral offsets, respectively. Additionally, the plot 300A includes plot points 304. The y-position of each plot point 304 can represent the amount of lateral offset for servos S1, S2, and read sensor R17 from the reference plane 206. As the servos S1, S2 are positioned on the reference line, their lateral offsets are 0, as indicated by their respective plot points 304. In contrast, the plot point 304 for the read sensor R17, indicates a non-zero lateral offset. Also, the plot 300A includes line 306A, which visually represents the in-plane bow of example element array 202-1. In this way, the module bow plotter 108 can generate a plot, i.e., plot 300A, that represents the in-plane module bow in the head module 202.

Figure 3B:
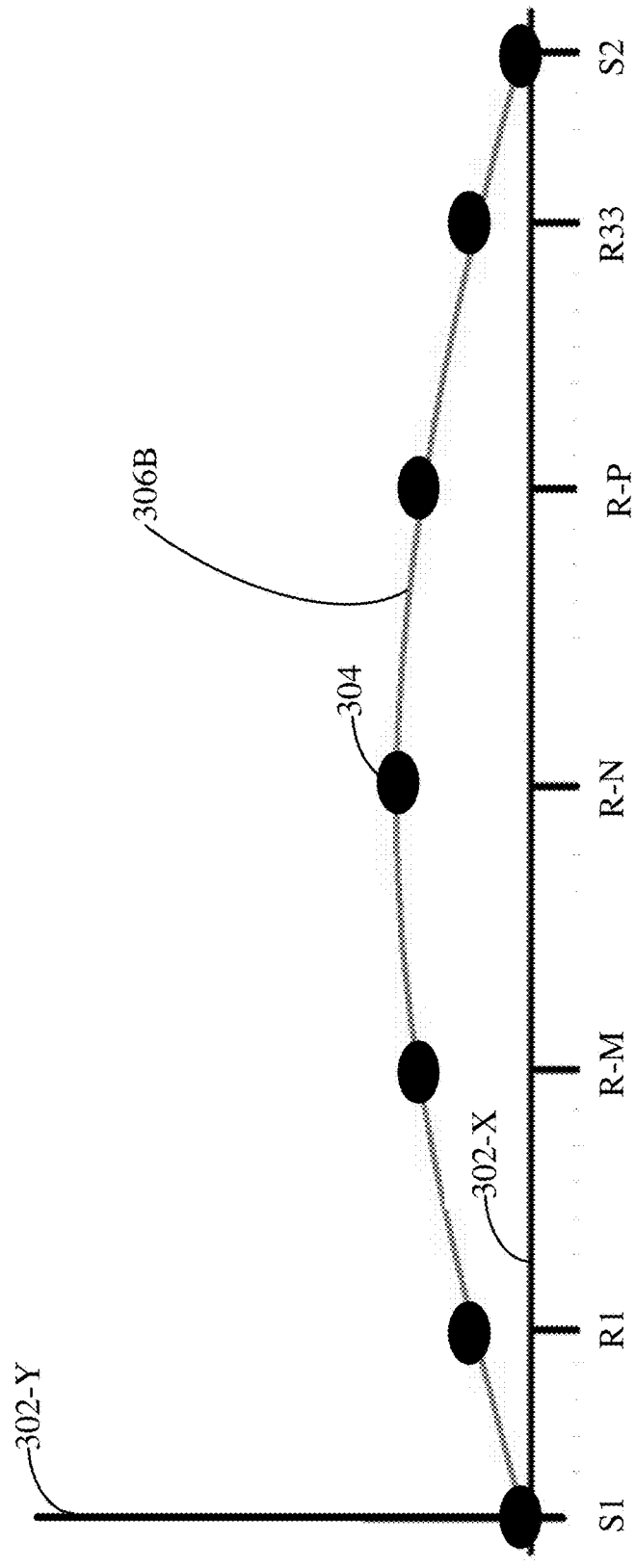
FIG. 3B is a block diagram of an example plot of the example element array, in accordance with some embodiments of the present disclosure.

FIG. 3B is a block diagram of an example plot of an example element array, in accordance with some embodiments of the present disclosure. The plot 300B represents the lateral position offset of multiple head module elements of the element array 202-1, as described with respect to FIG. 2C. More specifically, the plot 300B includes axes 302-X, 302-Y representing the head module elements and corresponding lateral offsets, respectively. Additionally, the plot 300B includes plot points 304. The y-position of each plot point 304 can represent the amount of lateral offset for servos S1, S2, and read sensors R-M, R-N, R-P from the reference plane 206. The read sensors R-M, R-N, R-P can correspond to read sensors captured in images 204-M, 204-N, 204-P, respectively. As the servos S1, S2 are positioned on the reference line, their lateral offsets are 0, as indicated by their respective plot points 304. In contrast, the plot point 304 for the read sensors R-M, R-N, R-P, indicate a non-zero lateral offset. Also, the plot 300B includes line 306B, which visually represents the in-plane bow of example element array 202-1. In this way, the module bow plotter 108 can generate a plot, i.e., plot 300B, that represents the in-plane module bow in the head module 202.

While this example uses five head module elements to determine in-plane bow, the module bow plotter 108 can use a range of head module elements, ranging from three to all. In this way, the module bow plotter 108 can identify more complex distortions to the alignment of the head module than a single curvature.

Figure 4:
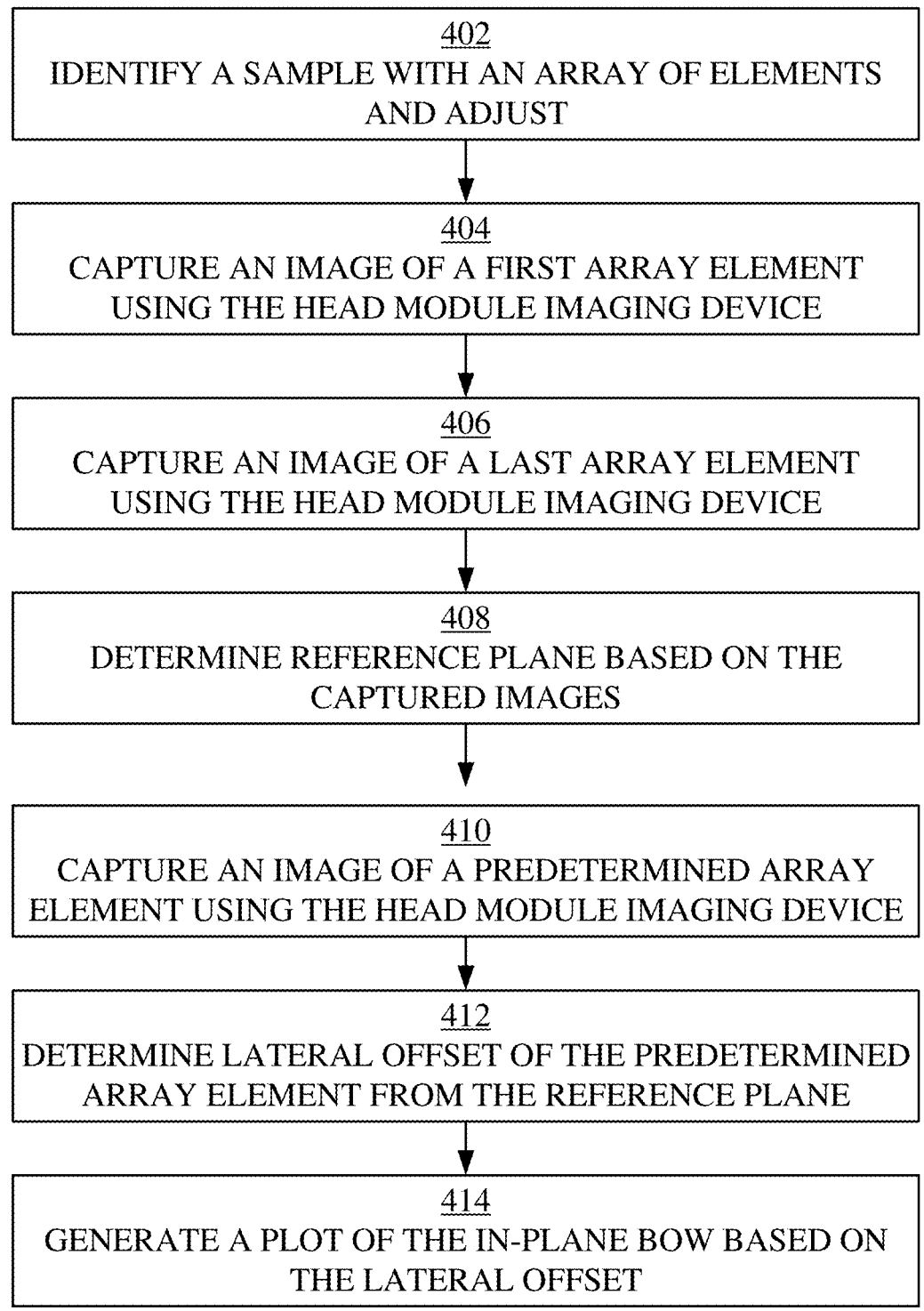
FIG. 4 is a process flow chart of a method for determining in-plane bow of a tape drive head module, in accordance with some embodiments of the present disclosure.

FIG. 4 is a process flow chart of a method 400 for determining in-plane bow of a tape drive head module, in accordance with some embodiments of the present disclosure. In some embodiments, the module bow plotter 108 can perform the method 400.

At operation 402, the module bow plotter 108 can identify a head module with an element array and adjust for tilt and rotation. The head module can be, for example, the head module 102 having element arrays 110. According to some embodiments of the present disclosure, the module bow plotter can identify a reference feature (one element at one end of an element array, e.g., servo S1). Adjusting for tilt and rotation can involve directing the rotary stage 104-2 to rotate the head module 102 such that the head module imaging device 106 can capture an image of the identifying feature.

This rotation can involve placing an individual head module element within a prescribed distance of the head module imaging device 106.

Multiple stages can be used for accommodating rotation and tilt, although tilt adjustment may not be involved (depending on the head module imaging device 106). For example, if the head module imaging device 106 is an atomic force microscope (AFM), tilt adjustment is not used because the AFM probe can find the surface of the head module 102. Optical measurements may involve tilt adjustment because the individual elements of the element arrays 110 may be out of focus.

At operation 404, the module bow plotter 108 can capture an image of a first array element with the head module imaging device 106. The module bow plotter can direct the head module imaging device 106 to capture an image of the servo S1.

At operation 406, the module bow plotter 108 can captures an image of a last array element with the head module imaging device 106. The module bow plotter 108 can direct the linear translation stage 104-1 to physically move the head module 102 to place the opposite end of the element array 110, e.g., servo S2, within capturing view of the head module imaging device 106. Changes in tilt and rotation can be accommodated by the rotary stage 104-2, so that no rotational or lateral movement may be needed going from one end of the array to the other. Once the module bow plotter 108 defines the reference plane having S1 and S2, there is no rotational movement involved to determine the measurements between S1 and S2. Additionally, the module bow plotter 108 directs the head module imaging device 106 to capture an image of the last array element.

At operation 408, the module bow plotter 108 can determine a reference plane based on the captured images. The images can represent the positions in physical space of the servos S1, S2. Accordingly, a plane encompassing the first array element and the last array element can represent a reference plane, such as, the reference plane 206 described with respect to FIGS. 2A, 2B. The head module imaging device 106 can capture an image of the device, or marker, in the frame of view. In defining the reference plane 206, the module bow plotter 108 can overlay the images of S1 and S2. In this way, the module bow plotter 108 can determine the difference in X and Y between the markers that define the reference plane. Additionally, the module bow plotter 108 can determine subsequent measurements of elements, e.g., R1-R33, by overlaying their respective images on top of the reference plane 206.

At operation 410, the module bow plotter 108 can capture an image of a predetermined array element with the head module imaging device 106. The head module imaging device 106 can capture any array element between the first and last array elements. In some embodiments of the present disclosure, the predetermined array element can be a head module element disposed near a middle position of the element array 110, such as the read sensor R17 described with respect to FIGS. 2B, 2C. Accordingly, the module bow plotter 108 can direct the stages 104 to position the predetermined array element within capturing view of the head module imaging device 106. Additionally, the module bow plotter 108 can direct the head module imaging device 106 to capture an image of the predetermined array element.

At operation 412, the module bow plotter 108 can determine a lateral offset of the predetermined array element from the reference plane. The lateral offset can represent a deviation from the reference plane defined by the first and last array elements described above. Accordingly, the lateral offset can indicate the in-plane bow.

At operation 414, the module bow plotter 108 can generate a plot of the in-plane bow based on the lateral offset. The plot can be for example, similar to the plot 300A. As stated previously, the module bow plotter 108 can capture images of multiple head module elements, up to and including all the elements of the element array 110. In this way, the module bow plotter 108 can generate a more complete profile of the in-plane bow than can be determined with a single predetermined array element. A plot generated using multiple array elements can be similar to the plot 300B.

Additionally, the module bow plotter 108 can measure the distance and angles between two lines of array elements. For example, a first array of reader elements deposited on a separate plane from a second array of reader elements can create a displacement between the two element arrays 110 that can be represented as an angle and/or distance. In tape, it is useful to read back data as it is written. This means that the readers are lined up with writers to certain tolerances, such that, when a line of writers writes a data track, a separate line of readers can read back what was written. If the angles and distance between the line of readers and the line of writers violates these tolerances, the read heads cannot read back.

Figure 5:
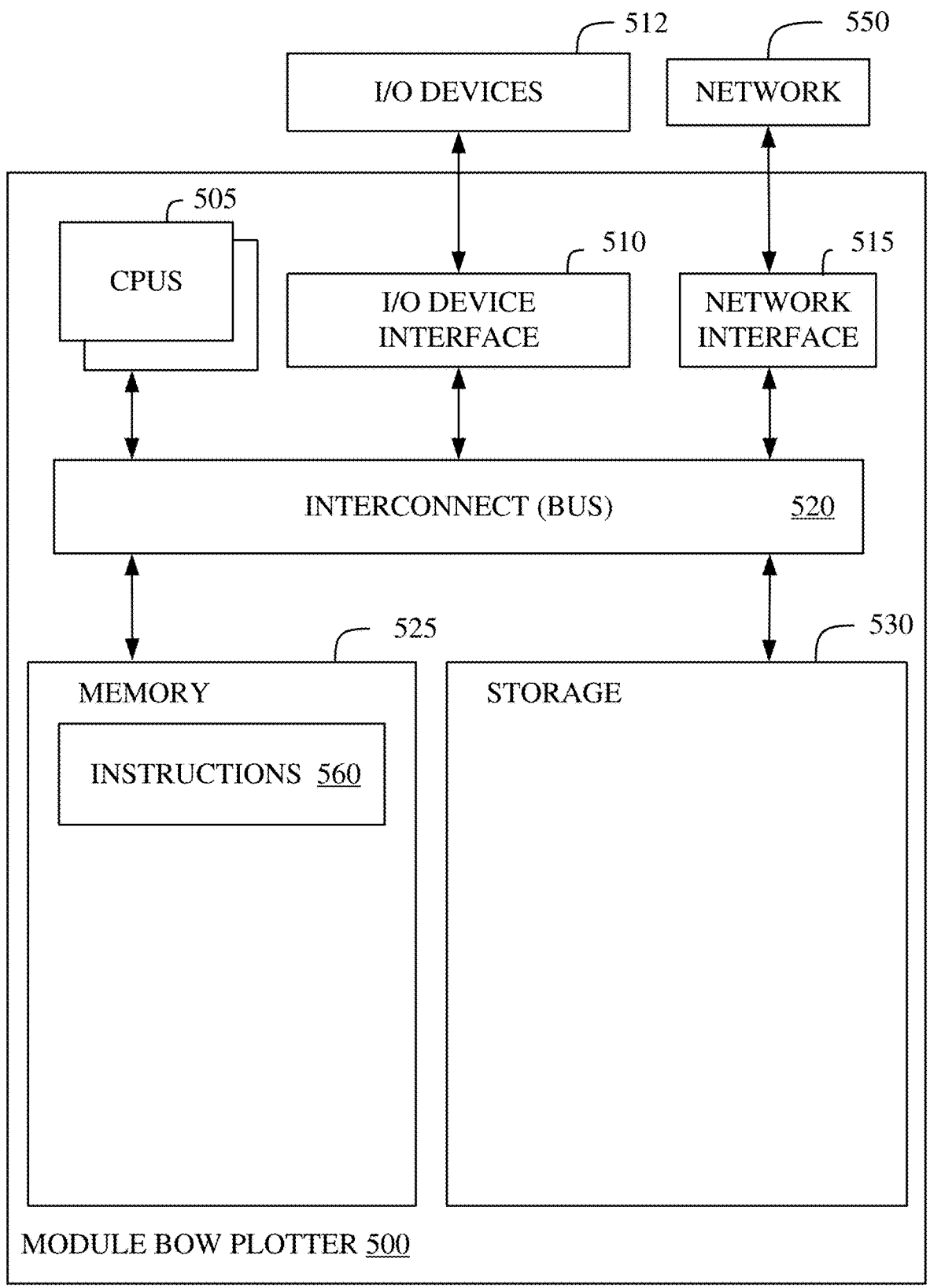
FIG. 5 is a block diagram of an example module bow plotter, in accordance with some embodiments of the present disclosure.

FIG. 5 is a block diagram of an example module bow plotter 500, in accordance with some embodiments of the present disclosure. In various embodiments, the module bow plotter 500 is similar to the module bow plotter 108 and can perform the method described in FIG. 4 and/or the functionality discussed in FIGS. 1, 2A-2C, 3A, and 3B. In some embodiments, the module bow plotter 500 provides instructions for the aforementioned methods and/or functionalities to a client machine such that the client machine executes the method, or a portion of the method, based on the instructions provided by the module bow plotter 500. In some embodiments, the module bow plotter 500 comprises software executing on hardware incorporated into a plurality of devices.

The module bow plotter 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the module bow plotter 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the method described in FIG. 4 and/or the functionality discussed in FIGS. 1, 2A-2C, 3A, and 3B.

In various embodiments, the I/O devices 512 include an interface capable of presenting information and receiving input. For example, I/O devices 512 can present information to a listener interacting with module bow plotter 500 and receive input from the listener.

The module bow plotter 500 is connected to the network 550 via the network interface 515. Network 550 can comprise a physical, wireless, cellular, or different network.

In some embodiments, the module bow plotter 500 can be a multi-user mainframe computer system, a single-user system, or a server computer or similar device that has little or no direct user interface but receives requests from other computer systems (clients). Further, in some embodiments, the module bow plotter 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary module bow plotter 500. In some embodiments, however, individual components can have greater or lesser complexity than as represented in FIG. 5, components other than or in addition to those shown in FIG. 5 can be present, and the number, type, and configuration of such components can vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining a reference plane for a tape drive read-write array comprising a first array element, a predetermined array element, and a last array element, wherein determining the reference plane is based on a first array position of the first array element and a last array position of the last array element;
   capturing a position of a predetermined array element using an imaging device;
   determining a deviation of the captured position from the reference plane; and
   generating a plot of an in-plane bow based on the deviation.

2. The method of claim 1, wherein determining the reference plane comprises:
   capturing a first image of the first array element;
   capturing a second image of the last array element;
   overlaying the first image with the second image; and
   determining that the reference plane comprises the first array element and the last array element.

3. The method of claim 1, wherein determining the reference plane comprises:
   identifying a head module with an array of elements;
   adjusting for rotation;
   capturing the first array position using the imaging device; and
   capturing the last array position using the imaging device.

4. The method of claim 3, wherein determining the reference plane comprises adjusting for tilt.

5. The method of claim 1, wherein the imaging device captures the first array position and the last array position.

6. The method of claim 1, further comprising:
   capturing a plurality of positions of a plurality of array elements using the imaging device;
   determining a plurality of deviations from the reference plane that correspond to the plurality of positions; and
   generating a plot of the in-plane bow based on the plurality of deviations.

7. The method of claim 1, wherein the imaging device is selected from a group comprising:
   an atomic force microscope;
   an electron microscope;
   an ultra-violet (UV) microscope; and
   a high-powered microscope.

8. A system comprising:
   a computer processing circuit; and
   a computer-readable storage medium storing instructions, which, when executed by the computer processing circuit, are configured to cause the computer processing circuit to perform a method comprising:
   determining a reference plane for a tape drive read-write array comprising a first array element, a predetermined array element, and a last array element, wherein determining the reference plane is based on a first array position of the first array element and a last array position of the last array element;
   capturing a position of a predetermined array element using an imaging device;
   determining a deviation of the captured position from the reference plane; and
   generating a plot of an in-plane bow based on the deviation.

9. The system of claim 8, wherein determining the reference plane comprises:
   capturing a first image of the first array element;
   capturing a second image of the last array element;
   overlaying the first image with the second image; and
   determining that the reference plane comprises the first array element and the last array element.

10. The system of claim 8, wherein determining the reference plane comprises:
    identifying a head module with an array of elements;
    adjusting for rotation;
    capturing the first array position using the imaging device; and
    capturing the last array position using the imaging device.

11. The system of claim 10, wherein determining the reference plane comprises adjusting for tilt.

12. The system of claim 8, wherein the imaging device captures the first array position and the last array position.

13. The system of claim 8, the method further comprising:
    capturing a plurality of positions of a plurality of array elements using the imaging device;
    determining a plurality of deviations from the reference plane that correspond to the plurality of positions; and
    generating a plot of the in-plane bow based on the plurality of deviations.

14. The system of claim 8, wherein the imaging device is selected from a group comprising:
    an atomic force microscope;
    an electron microscope;
    an ultra-violet (UV) microscope; and
    a high-powered microscope.

15. A computer program product comprising one or more computer readable storage media, and program instructions collectively stored on the one or more computer readable storage media, the program instructions comprising instructions configured to cause one or more processors to perform a method comprising:
- determining a reference plane for a tape drive read-write array comprising a first array element, a predetermined array element, and a last array element, wherein determining the reference plane is based on a first array position of the first array element and a last array position of the last array element, wherein determining the reference plane comprises:
  - capturing a first image of the first array element;
  - capturing a second image of the last array element;
  - overlaying the first image with the second image; and
  - determining that the reference plane comprises the first array element and the last array element;
- capturing a position of a predetermined array element using an imaging device;
- determining a deviation of the captured position from the reference plane; and
- generating a plot of an in-plane bow based on the deviation.

16. The computer program product of claim 15, wherein determining the reference plane comprises:
- identifying a head module with an array of elements;
- adjusting for rotation;
- capturing the first array position using the imaging device; and
- capturing the last array position using the imaging device.

17. The computer program product of claim 16, wherein determining the reference plane comprises adjusting for tilt.

18. The computer program product of claim 15, wherein the imaging device captures the first array position and the last array position.

19. The computer program product of claim 15, further comprising:
- capturing a plurality of positions of a plurality of array elements using the imaging device;
- determining a plurality of deviations from the reference plane that correspond to the plurality of positions; and
- generating a plot of the in-plane bow based on the plurality of deviations.

20. The computer program product of claim 15, wherein the imaging device is selected from a group comprising:
- an atomic force microscope;
- an electron microscope;
- an ultra-violet (UV) microscope; and
- a high-powered microscope.

* * * * *